(12) United States Patent
Markki et al.

(10) Patent No.: US 7,298,743 B2
(45) Date of Patent: Nov. 20, 2007

(54) MOBILE ROUTER SUPPORT FOR IPV6

(75) Inventors: Outi Elisa Markki, Espoo (FI);
Timothy J. Kniveton, San Francisco, CA (US); Jari T. Malinen, Sunnyvale, CA (US); Vijay Devarapalli, Santa Clara, CA (US); Charles E. Perkins, Saratoga, CA (US)

(73) Assignee: Nokia Corporation, Espoo (FI)

( * ) Notice: Subject to any disclaimer, the term of this patent is extended or adjusted under 35 U.S.C. 154(b) by 869 days.

(21) Appl. No.: 10/295,014

(22) Filed: Nov. 14, 2002

(65) Prior Publication Data

US 2003/0117965 A1 Jun. 26, 2003

Related U.S. Application Data

(60) Provisional application No. 60/336,221, filed on Nov. 14, 2001.

(51) Int. Cl.
*H04L 12/28* (2006.01)
*H04L 12/56* (2006.01)

(52) U.S. Cl. .............. 370/392; 370/401; 370/410

(58) Field of Classification Search .................. None
See application file for complete search history.

(56) References Cited

U.S. PATENT DOCUMENTS

| | | | |
|---|---|---|---|
| 5,781,772 A | 7/1998 | Wilkinson, III et al. | |
| 5,796,740 A | 8/1998 | Perlman et al. | |
| 6,061,650 A | 5/2000 | Malkin et al. | |
| 6,061,712 A | 5/2000 | Tzeng | |
| 6,101,543 A | 8/2000 | Alden et al. | |
| 6,195,705 B1 | 2/2001 | Leung | |
| 6,223,172 B1 | 4/2001 | Hunter et al. | |
| 6,240,089 B1 | 5/2001 | Okanoue et al. | |
| 6,256,300 B1 | 7/2001 | Ahmed et al. | |
| 6,269,099 B1 | 7/2001 | Borella et al. | |
| 6,285,680 B1 | 9/2001 | Steinka et al. | |
| 6,636,498 B1 * | 10/2003 | Leung ......................... 370/338 |
| 6,771,609 B1 * | 8/2004 | Gudat et al. ................ 370/254 |

FOREIGN PATENT DOCUMENTS

JP     2000-341330      12/2000

OTHER PUBLICATIONS

Liping, Shen et al. (2000) "Secure Mobile IPv6 System," Network and Communication, Computer Engineering and Application 2000. 6, pp. 125-128, (original Chinese language version).

(Continued)

*Primary Examiner*—Daniel J. Ryman
(74) *Attorney, Agent, or Firm*—Squire, Sanders & Dempsey L.L.P.

(57) ABSTRACT

A method and system for supporting mobile routers in Internet Protocol version 6 (IPv6) is provided. A mobile router obtains a care-of-address associated with an address configuration. The mobile router registers the care-of-address with a home agent. A bi-directional tunnel is established between the mobile router and the home agent. Packets are then forwarded via the bi-directional tunnel.

8 Claims, 5 Drawing Sheets

OTHER PUBLICATIONS

Liping, Shen et al. (2000) "Secure Mobile IPv6 System," Network and Communication, Computer Engineering and Application 2000. 6, pp. 125-128, (English translation—10 pages).

Okajima, Ichiro et al. (2001) "Mobile IPv6 Extensions Supporting Mobile Networks," Technical Report of IEICE IN2001-15, 101(62):105-113 (English language translation of Abstract provided).

Ernst, Theirry et al. (2001) "Mobile Networks Support in Mobile IPv6 (Prefix Scope Binding Updates)," found at http://www.watersprings.org/pub/id/draft-ernst-mobileip-v6-network-02.txt 20 pages.

Japanese Office Action dated Jul. 24, 2006, received in Japanese Patent Application No. 2003-544937 (English language translation attached), 6 pages.

DHCP for IPv6; Charles E. Perkins and Jim Bound; Sun Microsystems, Inc., Palo Alto, CA 94303; Digital Equipment Company, Nashua, NH 03062 Jul. 1998.

S. Corson; University of Maryland; J. Macker; Naval Research Laboratory, Jan. 1999; "Mobile Ad hoc Networking (MANET): Routing Protocol Performance Issues and Evaluation Considerations"; Copyright (C) The Internet Society (1999).

* cited by examiner

MOBILE ROUTER SUPPORT FOR IPV6

RELATED APPLICATION

This application is a Utility Patent application based on a previously filed U.S. Provisional Patent application, U.S. Ser. No. 60/336,221 filed on Nov. 14, 2001, the benefit of the filing date of which is hereby claimed under 35 U.S.C. §119(e).

FIELD OF THE INVENTION

This invention relates generally to networking and more specifically, to a system and method for supporting mobile routers in IPv6.

BACKGROUND

Whether walking, flying, or riding, people are frequently traveling. While traveling, they often carry or go with one or more electronic devices. For example, many people carry a cellular phone with them. In addition, while traveling in a car, a person might be traveling with a laptop, car electronics, and other electronic devices.

Maintaining connectivity with the Internet is increasingly becoming more important. People like to check stocks, weather, and correspond via email. They like to have their electronic calendars available at all times and have access to files and Internet content. Gamers like to play other gamers online.

With this need to maintain connectivity comes challenges. Building each device with cellular or satellite communication capabilities might obtain an "always-on" experience but at an economic cost both to producers and consumers. For example, a user may not wish to pay a monthly connection charge for each device the user has. Nor may the user wish to pay more for the capability of each device to connect through a cellular or satellite channel. Thus, there is a need for a means for leveraging existing infrastructure to provide Internet connectivity to a group of devices traveling in a mobile environment.

SUMMARY

A method and system for supporting mobile routers in Internet Protocol version 6 (IPv6) is provided. A mobile router obtains a care-of-address associated with an address configuration. The mobile router registers the care-of-address with a home agent. A bi-directional tunnel is established between the mobile router and the home agent. Packets are then forwarded via the bi-directional tunnel.

In one aspect of the invention, a request is made that packets that include an address prefix within a set of prefixes be forwarded to the mobile router.

In another aspect of the invention, configuration information is forwarded via the bi-directional tunnel. The configuration information may be routing information. The configuration information may be static or dynamic. The configuration information may be encapsulated.

In another aspect of the invention, the mobile router obtains the care-of-address while attaching to a network. The network is associated with a network address. The network address includes a prefix. The care-of-address is generated by combining the prefix with an identifier that identifies the mobile router.

In another aspect of the invention, the home agent receives a packet that includes a home address of the mobile router. The packet is then forwarded via the bi-directional tunnel to the mobile router. The home address of the mobile router may be employed to retrieve the care-of-address from a table included on the home agent.

In another aspect of the invention, a home agent updates a routing table. The routing table includes a routing entry associated with a mobile router that is reachable from the home agent. The home agent receives a packet. The home agent selects a bi-directional tunnel associated with the mobile router. The home agent then tunnels the packet to the mobile router. The packet may be destined to the mobile router or to a node on a mobile network reachable through the mobile router.

According to another aspect of the invention, a system is disclosed that operates substantially according to the aspects described above.

These and various other features as well as advantages, which characterize the present invention, will be apparent from a reading of the following detailed description and a review of the associated drawings.

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined by the appended claims.

In embodiments of the invention, a mobile node acting as a mobile router may automatically register with its home domain and preserve sessions to multiple devices moving along with the mobile node. There can be multiple devices, fixed or mobile, behind the mobile router. It is also possible to apply this access method recursively, creating nested mobile networks, which operate within other mobile networks.

On current mobile IPv6-based data communication networks, the mode of operation for mobile networks supports host mobility. Router mobility is assumed as an extension to host mobility such that a subnet can connect to a mobile node and move with it.

Embodiments of the invention described below provide a method by which a mobile router and its home agent can support insertion of forwarding table entries for hosts and networks directly accessible to the mobile router, and moving along with it, whose packets are forwarded by the mobile router to the rest of the Internet. The method considers two cases. The first case is a consumer device which gets a pre-configured static network route from the home agent. The home agent inserts and removes this route as a function of whether the mobile router is registered with its home agent or not. The second case considers a full-featured mobile router which runs a routing protocol as if it were in its home domain. This dynamic routing protocol signaling is extended over bi-directional tunneling between the mobile router and its home agent so that this tunnel seems like a virtual point-to-point link. The link is used to forward packets between the mobile router (and its attached mobile network) and the home network, so that packets to and from the mobile network appear to be processed and returned from the home domain. Thus, mobility is invisible to hosts on the mobile network, and to nodes corresponding to those hosts.

One case when this method is useful is when users with multiple personal devices move and attach to different points of access to the global Internet. The personal devices are assumed to be IPv6 capable and can also connect to the global Internet via a primary device, such as a mobile router. Also, the method enables a distributed organization where a cloud of nodes can connect to a corporate network over the public Internet, e.g., by a secure bi-directional tunnel, and extend the corporate network to a moving set of nodes connected through a mobile router running a dynamic routing protocol.

This method can perform routing in accordance with existing routing protocols. Routing is facilitated by the tunnel between the mobile router and the home agent. Authorization to change the forwarding state stems from the existing agreements implemented by aggregation routers along the path to the home network. The method can be performed without modifying existing protocols. Instead, implementation changes are made in the home agent and mobile router. Furthermore, nodes on the mobile network need not be aware of the mobility of the network.

Embodiments of the invention provide a method whereby a host connected through dynamic and mobile connections to the Internet can act as a router for other hosts traveling with it, with little or no manual configuration.

Embodiments of the invention reuse Mobile IPv6 to allow a mobile router to access the Internet through various care-of-addresses, while maintaining the mobile router's permanent, globally-reachable home address. This is accomplished through the methods described below that improve a Mobile IPv6 implementation to allow router mobility without changing the underlying message formats or adding protocol extensions.

A care-of-address is used when a mobile router is away from its home network. A care-of-address is an address at which the mobile router may be reached while the mobile router is away from its home network. First, the mobile node obtains an address (a care-of-address) on the network to which it attaches. An address (care-of address) may be obtained by a stateless address autoconfiguration, a stateful address configuration, and the like. The stateful address configuration includes those actions where the mobile router may employ Dynamic Host Configuration Protocol (DHCP), a server, or some other mechanism to obtain this address. The stateless address autoconfiguration includes those actions where the mobile router may generate this address by combining a network prefix advertised of the network and an identifier unique to the mobile router. However, the invention is not limited to these approaches, and virtually any mechanism may be employed that enables the mobile router to obtain a care-of-address on the network to which it attaches. In any event, the mobile router then sends a binding update including the care-of-address to the mobile router's home agent. When the home agent receives traffic that is directed to the mobile router's home address, the home agent can then forward the traffic to the mobile router using the care-of-address included in the binding update.

Embodiments of the invention involve using various existing protocols and protocol message exchanges to establish state on both the mobile router and its Mobile IPv6 home agent. This state allows packets destined for the mobile router or any of the hosts connected to a mobile network utilizing the mobile router to be tunneled by the home agent from their usual arrival point at the home network (where the home agent resides) to the mobile router at its current attachment point. Additionally, packets from nodes on the home network are sent back through the tunnel to the home network and then forwarded as usual from there to their intended destinations. This avoids the packets being ignored by routers at the current attachment point due to incorrect topology. The method may be implemented by adding functionality and packet forwarding rules to the network code in both the mobile router and home agent implementation.

Mobile Router Implementation Changes

Figure 4:
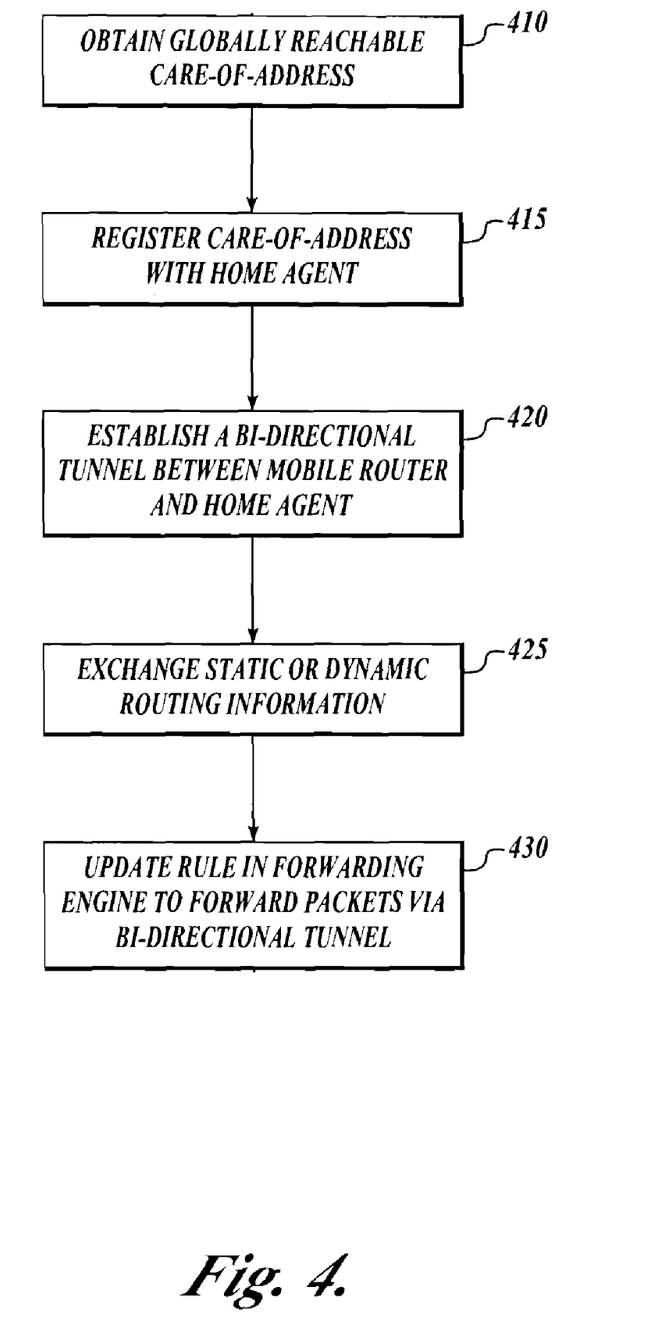
FIG. 4 shows a flowchart illustrating an exemplary method in which a mobile router operates.

FIG. 4 shows a flowchart illustrating an exemplary method in which a mobile router operates. The mobile router's implementation changes as follows:

(1) When the mobile router is traveling away from its home network and has reached a new attachment point, it obtains a globally reachable care-of-address as specified by an Address configuration (block 410). Address configuration may include stateless address autoconfiguration, stateful address configuration, and the like. In any event, after an address is generated, a check is typically performed to determine whether any other node in the network is using the address. If no other node is using the address (which is typical), the attached node may then use the address.

(2) The mobile router registers its care-of-address with its home agent by sending a Mobile IPv6 Binding Update message, allowing packets arriving at its home network to be tunneled to it at its current attachment point (block 415).

(3) The mobile router establishes a bi-directional tunnel between itself and its home agent (block 420).

(4) The mobile router either uses static configuration information (consumer case) or runs a dynamic routing protocol with its home agent (fully enabled case) to exchange routing information about its mobile network with the home agent (block 425). For example, a cellular phone used as a mobile router would not typically be allowed to update the routing table of a cellular provider's router acting as the cellular phone's home agent. Nor would the cellular phone used as a mobile router wish to obtain all of the routing information available on the cellular provider's router. Rather, the cellular phone may be configured statically to send all outgoing traffic not destined to the mobile network to the cellular provider's router.

On the other hand, a mobile router contained on, for example, a cruise ship with hundreds of computers may be allowed to engage in a dynamic routing protocol and to exchange routing information with the mobile router's home network router and other routers.

(5) In the fully enabled mode, the mobile router runs a dynamic routing protocol with its home agent to exchange up-to-date routing information. The mobile router continues running this intra-domain routing protocol even when it moves away from home and attaches to a visited domain. This is achieved by dynamically modifying the list of the interfaces on which the routing protocol is active. For example, assume a mobile router used interface 'A' when it was connected to its home network and was exchanging routing updates through that interface. When the mobile router moves and attaches to a visited network with the same interface, the routing protocol is turned off for interface 'A'. This is to prevent the mobile router from advertising the routes in its mobile subnet to the visited network.

(6) The mobile router then sets up an encapsulating tunnel to its Home Agent. An encapsulating tunnel is any method, secure or otherwise, that could be used to transmit data between the mobile router and the Home Agent. For example, a packet may be encapsulated in another packet and sent to the home agent. Typically, the tunnel is made secure to provide a secure communication channel. This encapsulating tunnel is then added as a virtual interface to the list of interfaces on which the routing protocol is active. The mobile router then starts sending routing information through this tunnel to the Home Agent. Most IPv6 intra-domain routing protocols assume link-local address to appear as the source address for routing information messages. The encapsulating tunnel takes care of this by encapsulating the routing messages in another IP header. The outer IP header has the source address as the mobile router's current care-of-address and the destination address as the Home Agent's address. When the Home Agent receives the tunneled routing message, it decapsulates it and processes the inner routing message. The inner routing message appears as if the packet was sent from a node on the link.

(7) The mobile router then sends router advertisements to its mobile network, using either a standard Neighbor Discovery protocol or running an ad-hoc networking protocol, such as AODV (ad hoc on demand distance vector routing protocol), to connect to other mobile hosts (8) The mobile router makes a rule in its forwarding engine to forward packets between its mobile network and the home network via the bi-directional tunnel established in step 3 (block 430).

Home Agent Changes

Figure 5:
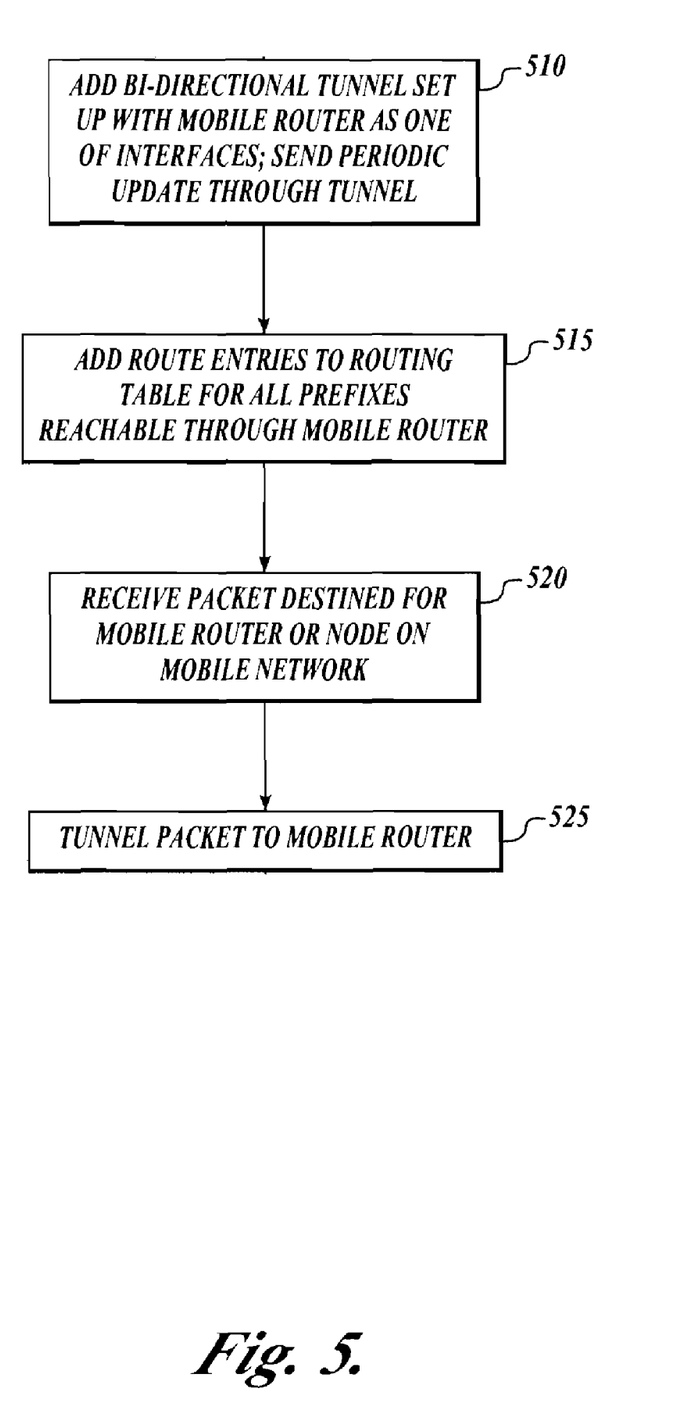
FIG. 5 shows a flowchart illustrating an exemplary method in which a home agent operates.

FIG. 5 shows a flowchart illustrating an exemplary method in which a home agent operates. The Home Agent performs the following steps:

(1) The Home Agent adds the bi-directional tunnel set up with the mobile router as one of the interfaces on which the intra-domain routing protocol is active. Then, the Home Agent sends periodic routing updates for the network prefixes that it is able to reach through this tunnel (block 510).

(2) The Home Agent also adds route entries to its routing table for all the prefixes reachable through the mobile router (block 515).

(3) When a packet destined for the mobile router is received by the Home Agent, the binding cache entry for the mobile router is found, and the packet is tunneled to the mobile router (blocks 520 and 525). This is the same as would happen with any other mobile node as defined by Mobile IPv6.

(4) When a packet is received by the home agent that is destined for a node on the mobile network, the home agent finds a route entry for the mobile network where the mobile router is listed as the next hop gateway. The home agent then does another routing lookup for the mobile router and finds the original binding cache entry, causing the packet to be tunneled to the mobile router (blocks 520 and 525). Blocks 520 and 525 may be repeated for each packet the mobile router receives that is destined to the mobile router or a node on the mobile network.

Exemplary Systems

Figure 1:
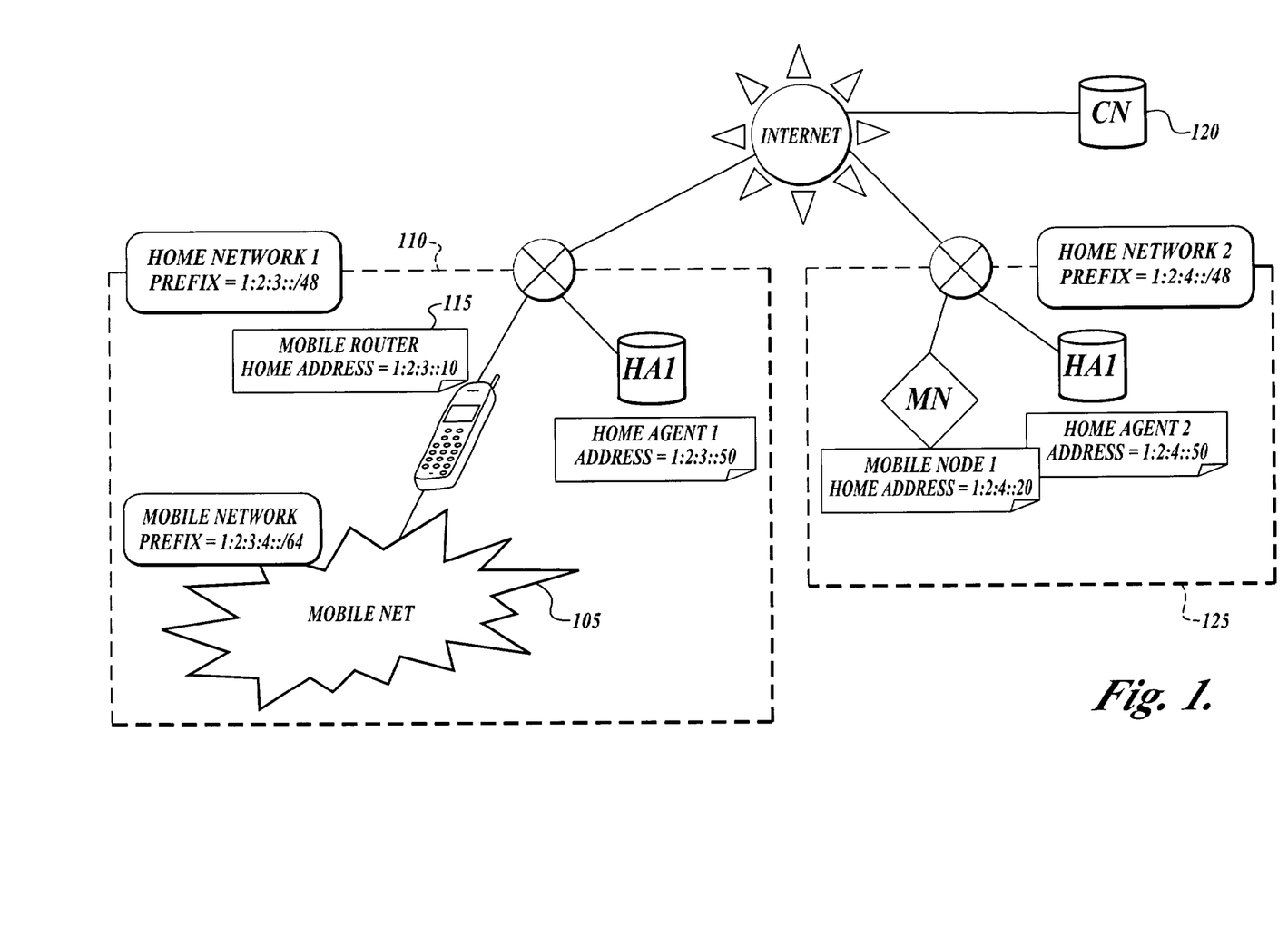
FIG. 1 shows a block diagram of a mobile router and a mobile node both at home.

FIG. 1 shows a block diagram of a mobile router and a mobile node both at home. In the network configuration of FIG. 1, messages can be routed using normal IPv6 mechanisms. Note that mobile network 105's prefix is aggregated with home network 110's prefix. When mobile router 115 is at home and attached a home link, the packets destined for the mobile network show up on one mobile router 115's interfaces. Then, mobile router 115 can route the packets to mobile network 105. In this case, mobile router 115 acts as a normal router.

Correspondent node 120 is a node somewhere on the Internet that is trying to send a message. Correspondent node 120 does not need to know anything about mobility of nodes in mobile network 105 to send a message to mobile network 105.

Figure 2:
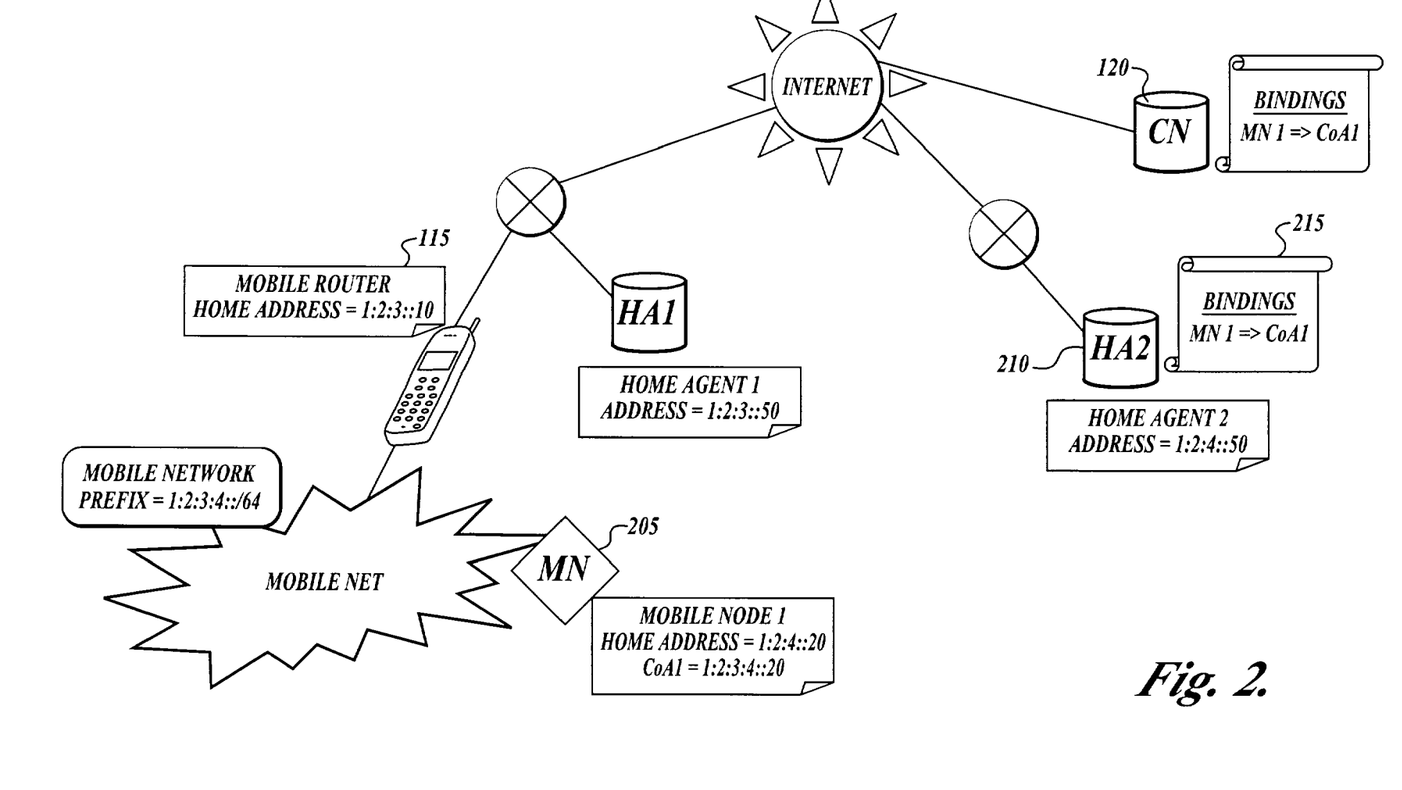
FIG. 2 shows a block diagram of a mobile node docked in a mobile network.

FIG. 2 shows a block diagram of a mobile node docked in a mobile network. Mobile router 115 is still attached to its home network. A packet from correspondent node 120 to mobile node may be directed in one of two or more paths. If correspondent node 120 does not know anything about the mobility of mobile node 205, correspondent node 120 may send the packet to a home address of mobile node 205. After being transmitted to the home network of mobile node 205, home agent 210 may pick up the packet. After it receives the packet, home agent 210 may perform a lookup on a bindings table 215. In bindings table 215, home agent 210 may find a binding entry that tells home agent 210 a care-of-address for mobile node 205. Home agent 210 may then forward the packet to the care-of-address which causes the packet to be delivered to mobile router 115 and then mobile node 205.

Correspondent node 120 may support binding and be aware of the mobility of mobile node 205. When correspondent node 120 does support binding, correspondent node 120 may send messages directed to mobile node 205's care-of-address.

Figure 3:
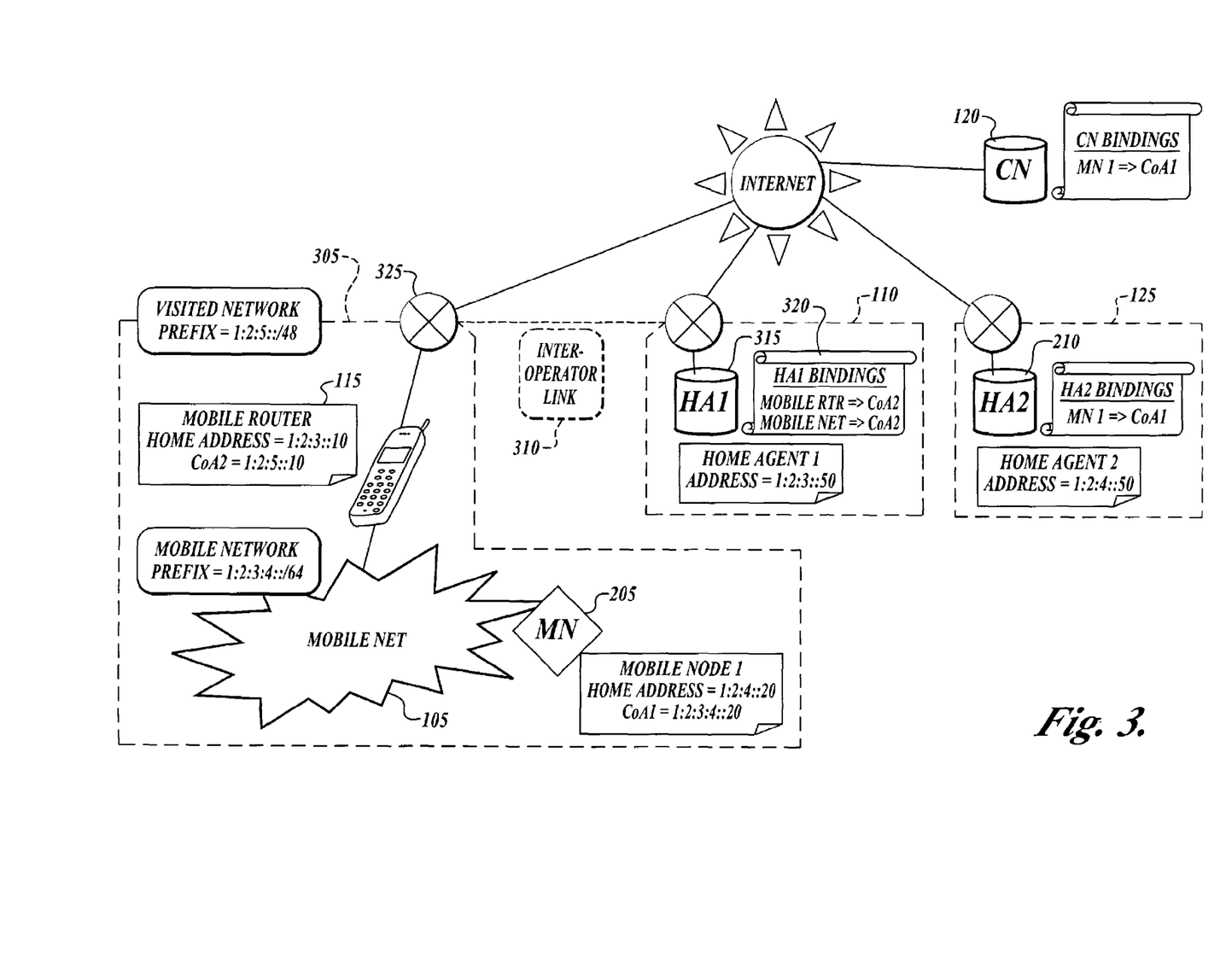
FIG. 3 shows a block diagram of a mobile node docked in a mobile network accessed through a mobile router, where the mobile router is attached to a foreign network.

FIG. 3 shows a block diagram of a mobile node docked in a mobile network accessed through a mobile router, where the mobile router is attached to a foreign network. Mobile router 115 is attached to visited network 305. Mobile router 115's home network (home network 110) and visited network 305 may be connected through optional inter-operator link 310. Inter-operator link 310 may provide a faster link wherein traffic is not required to go through the Internet when going between routers on home network 110 and visited network 305.

When correspondent node 120 is sending a message to mobile node 205 or any other node on mobile network 105 through mobile router 115, the message will arrive on home network 110. Home agent 315 will see the message and that the message should be forwarded to the mobile network. Home agent 315 will perform a lookup in binding cache 320. When it finds a binding in binding cache 320, home agent 315 will recognize that home agent 315 should send the message to mobile router 1 15 at a care-of-address indicated in the binding. Home agent 315 may then send the message through a tunnel through the Internet through visited network router 325 to mobile router 115. In FIG. 3, mobile router 115 is attached at a care-of-address reachable at visited network 305.

Upon receipt of the packet, mobile router 115 decapsulates the packet and determines that it should route the packet to mobile network 105. Mobile router 115 then sends the message on mobile router 115's other interface to mobile network 105.

When correspondent node 120 is sending a message to mobile node 205 by addressing the message to mobile node 205's home address, the message arrives at home network 125. Home agent 210 sees the message. Home agent 210 performs a lookup in cache bindings 215 and finds that the message should be forwarded to a care-of-address. Home agent 315 may then send the message through a tunnel to the care-of-address. Home agent 315 sees the message and performs a lookup of in cache bindings 320. A binding in cache bindings 320 indicates that the message should be forwarded to mobile network 105. Home agent 315 may then forward the message through a tunnel to mobile router 115. Mobile router 115 may then decapsulate the message and forward the message to mobile network 105.

The various embodiments of the invention may be implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, or any combination thereof without deviating from the spirit or scope of the present invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for supporting mobile routers in IPv6, comprising: obtaining, by a mobile router from a visited network, a care-of-address associated with an address configuration;
   registering, by the mobile router, the care-of-address with a home agent of the mobile router;
   establishing, by the mobile router, a bi-directional tunnel between the mobile router and the home agent;
   forwarding from the mobile router to the home agent configuration information of a mobile network via the bi-directional tunnel wherein the mobile network is accessible through the mobile router;
   requesting that packets that include any address prefix within a set of prefixes be forwarded to the mobile router;
   forwarding a packet from the mobile router to a mobile node on the mobile network, wherein the mobile node has a care-of address that includes a prefix of a home address of the mobile network, and
   wherein the configuration information is static and the mobile router is configured to send all outgoing traffic not destined to the mobile network, to the home agent.

2. The method of claim 1, wherein the configuration information is routing information.

3. The method of claim 1, wherein the mobile router obtains the care-of-address while attaching to the visited network, the visited network associated with a network address, the network address including a prefix, and wherein the care-of-address associated with the address configuration is generated by combining the prefix with an identifier that identifies the mobile router.

4. The method of claim 1, wherein the mobile router obtains the care-of-address by at least one of a stateless address autoconfiguration, and a stateful address configuration.

5. The method of claim 1, further comprising encapsulating the configuration information with a source address and a destination address, wherein the care-of-address forms the source address and an address of the home agent forms the destination address, and wherein the configuration information includes a home address of the mobile router.

6. The method of claim 1, further comprising: receiving, at the home agent, a packet that includes a home address of the mobile router; and forwarding the packet via the bi-directional tunnel to the mobile router.

7. The method of claim 6, further comprising employing the home address to retrieve the care-of-address from a table included on the home agent.

8. A method for supporting mobile routers in IPv6, comprising: obtaining, by a mobile router from a visited network, a care-of-address associated with an address configuration;
   registering, by the mobile router, the care-of-address with a home agent of the mobile router;
   establishing, by the mobile router, a bi-directional tunnel between the mobile router and the home agent;
   forwarding from the mobile router to the home agent configuration information of a mobile network via the bi-directional tunnel wherein the mobile network is accessible through the mobile router;
   requesting that packets that include any address prefix within a set of prefixes be forwarded to the mobile router;
   forwarding a packet from the mobile router to a mobile node on the mobile network, wherein the mobile node has a care-of address that includes a prefix of a home address of the mobile network, and
   wherein the configuration information is dynamic and the mobile router runs a dynamic routing protocol and dynamically modifies a list of interfaces on which the routing protocol is active to prevent the mobile router from advertising routes in the mobile network to the visited network.

* * * * *